: US007342883B2

United States Patent
Szumilas

(10) Patent No.: US 7,342,883 B2
(45) Date of Patent: Mar. 11, 2008

(54) METHOD AND APPARATUS FOR MANAGING NETWORK TRAFFIC

(75) Inventor: Lech J. Szumilas, Ennis (IE)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 10/133,853

(22) Filed: Apr. 25, 2002

(65) Prior Publication Data
US 2003/0202470 A1    Oct. 30, 2003

(51) Int. Cl.
*H04L 12/26* (2006.01)
*H04J 3/22* (2006.01)
*G06F 15/173* (2006.01)

(52) U.S. Cl. ............... 370/233; 370/253; 370/395.52; 370/401; 370/468; 709/203; 709/213; 709/233; 709/244

(58) Field of Classification Search ............ 370/230.1, 370/231–235, 235.1, 237, 236.1, 236.2, 238.1, 370/395.21, 395.41, 395.43, 395.5, 395.52, 370/395.61, 252, 466, 468, 401
See application file for complete search history.

(56) References Cited

U.S. PATENT DOCUMENTS

| | | | | |
|---|---|---|---|---|
| 5,627,836 A * | 5/1997 | Conoscenti et al. | ........ | 370/397 |
| 5,706,279 A * | 1/1998 | Teraslinna | ........... | 370/232 |
| 6,597,662 B1 * | 7/2003 | Kumar et al. | ........... | 370/236 |
| 6,633,543 B1 * | 10/2003 | Storr | ........... | 370/236.1 |
| 6,973,229 B1 * | 12/2005 | Tzathas et al. | ........... | 385/16 |
| 7,013,084 B2 * | 3/2006 | Battou et al. | ........... | 398/45 |
| 7,082,502 B2 * | 7/2006 | Najam et al. | ........... | 711/147 |
| 7,116,666 B2 * | 10/2006 | Brewer et al. | ........... | 370/392 |
| 7,210,022 B2 * | 4/2007 | Jungck et al. | ........... | 712/34 |
| 7,234,144 B2 * | 6/2007 | Wilt et al. | ........... | 718/104 |
| 2002/0174207 A1 * | 11/2002 | Battou | ........... | 709/223 |
| 2003/0191857 A1 * | 10/2003 | Terrell et al. | ........... | 709/244 |

OTHER PUBLICATIONS

Hasegawa et al, Protocol architecture of high speed TCP/IP service over international ATM network, ATM Workshop Proceedings, 1998 IEEE, May 26-29, 1998 pp. 159-168 ☐☐.*

* cited by examiner

*Primary Examiner*—Edan Orgad
*Assistant Examiner*—Venkatesh Haliyur
(74) *Attorney, Agent, or Firm*—Caven & Aghevli LLC

(57) ABSTRACT

Numerous embodiments of a method and apparatus for managing network traffic are disclosed.

27 Claims, 3 Drawing Sheets

METHOD AND APPARATUS FOR MANAGING NETWORK TRAFFIC

BACKGROUND

A computer network typically comprises a number of nodes interconnected by a communications medium. A node may comprise a network device, such as a switch or hub, for example. A communication medium may include fiber optic cable, category 5 (CAT-5) network cabling, or radio waves, for example. In a packet based computer network, information is typically exchanged as electronic data, which may be embodied in one or more relatively short packets of data. The relatively short packets may comply with a particular type of data protocol. The particular protocol used by different nodes may vary, and an intermediate node may bridge these two dissimilar protocols. Differing protocols typically incorporate differing methods of packet processing, and may use differing levels of code complexity. These differences may result in differing quantities of data that must be transmitted for a given packet even if the underlying information is the same. As a result of these differences, if an intermediate node, such as a network device, is transferring packets between two or more nodes that utilize differing data protocols, the network device may not be able to send data packets to one node at the same rate in which they are received from another node, which may result in dropped packets. Additionally, if a network device is operating between several nodes that utilize differing protocols, a bottleneck may result if packets from one node require more processing time than packets from the other nodes. Therefore, a need exists for a method and/or apparatus for managing network data for a network device that operates between two or more nodes that utilize differing data protocols.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
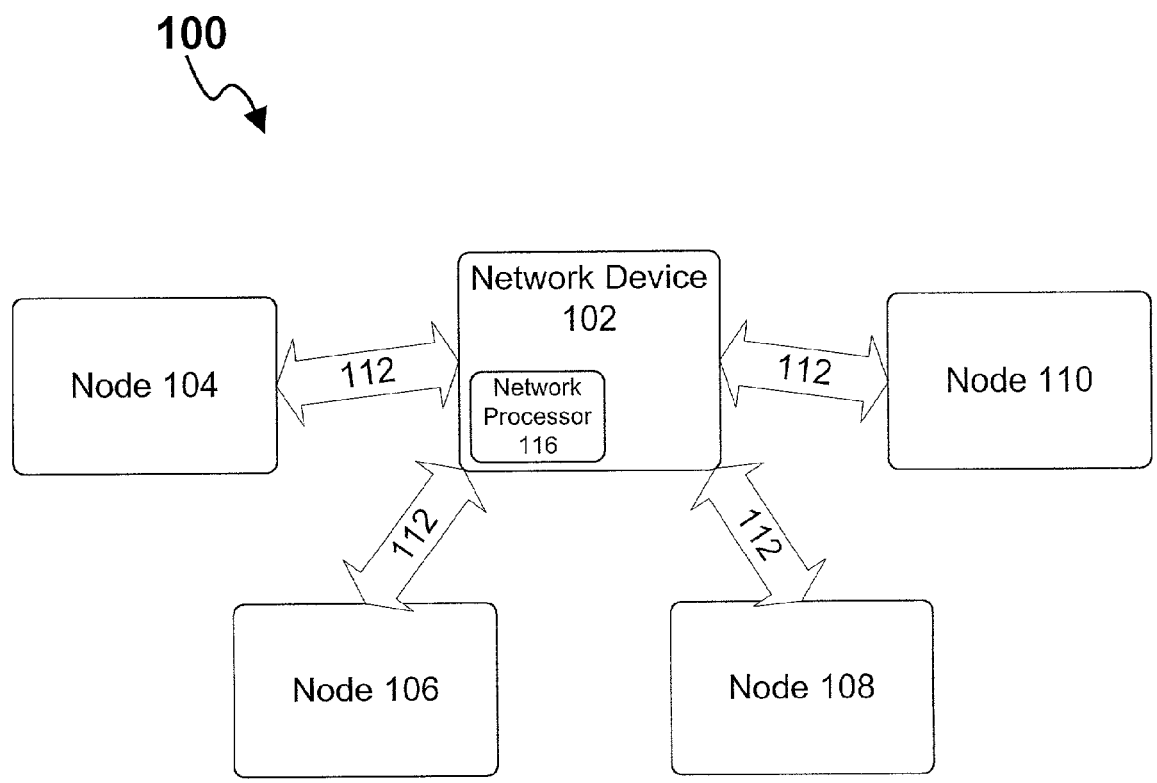
FIG. 1 is a first block diagram of a system suitable for practicing one embodiment of the claimed subject matter.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure embodiments of the claimed subject matter.

Embodiments of the claimed subject matter comprise a method and/or apparatus for scheduling and assigning processing time to one or more software threads executing on a network device. One or more network processors on the network device may execute these one or more software threads. One embodiment of the claimed subject matter may increase the efficiency of a network device, by increasing the number of packets processed by one or more processors of a network device over a particular period of time. The network device may have an increased efficiency by allowing assignment of processor time to software threads executing on the network device, depending on factors such as the quantity of data exchanged over a particular period of time, for example. Increased efficiency may lead to providing faster and more reliable network service to the user.

As stated previously, a network typically comprises a number of nodes interconnected by a communications medium. A node, in this context, may include a device capable of routing, switching, repeating, receiving or passing data between itself and one or more other nodes, and may additionally be referred to as a physical device, a transmitting device, or a receiving device, for example. Examples of physical devices, may include, for example, computers, servers, ports, routers, switches, hubs, and numerous other types of devices. A communication medium may be any medium capable of carrying information signals, such as, for example, twisted-pair wire, co-axial cable, fiber optic cable, category 5 (CAT-5) network cabling, or radio waves, for example. In a packet-based network, information is typically exchanged in the form of electronic data, typically embodied in one or more relatively short packets. In this context, the exchanging of data is referred to as traffic. A packet, in this context, may comprise a sequence of digital data pulses, with the sequence typically comprising a particular number of bits or bytes, such as 1000 bytes, for example. In a packet based network, data is typically exchanged by using one or more types of data protocols, such as the transmission control protocol (TCP), as defined by the Internet Engineering Task Force (IETF) standard 7, Request For Comments (RFC) 793, adopted in September 1981 ("TCP Specification"), available at www.ietf.org, and the Ethernet protocol as defined by the Institute for Electrical and Electronics Engineers (IEEE) standard 802.3, 2000 edition ("Ethernet Specification"), available from IEEE standards, 445 Hoes Lane, P.O. Box 1331, Piscataway, N.J., 08855-1331. Additional information may be found on the World Wide Web at the following URL: http://www.ieee-.org.

The physical topology of a packet-based network may comprise a source node, a destination node, and one or more intermediate nodes. The source node may transmit a set of information, such as a packet, to a destination node, and the packet may be routed through one or more intermediate nodes prior to reaching the destination node. Information, such as a packet, may include any data capable of being represented as a signal, such as an electrical, optical, or acoustical signal, for example. The particular protocol used by the source and destination node may be different, and an intermediate node may bridge these two dissimilar protocols. An intermediate node may comprise a network device, such as a router, switch, port or hub, for example. A network device may be comprised of one or more network processors, and may include one or more ports. A network device may have multiple ports, and may additionally have the capability to perform processing for packets for one or more of these ports simultaneously. Processing packets may include transfer and/or routing of packets between ports, which may result in transfer of information between two or more nodes that are coupled to two or more ports. The one or more network processors of a network device may execute one or more software threads that may perform processing functions such as packet receive, table look up, or packet classification, for example. A particular software thread may be dedicated to processing packets complying with a particular data protocol, although the claimed subject matter is not so limited.

Differing nodes may utilize differing protocols, and differing protocols typically incorporate differing methods or quantities of packet processing. Packet processing may include addressing and data checking, for example. Additionally, differing protocols may differ in the amount and type of overhead, or additional data, that must be added to packets during transmission. This may result in differing quantities of data that must be transmitted for a given packet even if the underlying information is the same. A network device, which performs the task of processing packets, may not be capable of sending and/or receiving the same number of packets for each node it is coupled to, due at least in part to some of these differences. Stated differently, use of these differing protocols by one or more nodes may result in a network device utilizing the same rate of processing for each node it is coupled to, such as 100 Megabits/second (Mb/s), but may result in a differing number of packets processed with respect to each node, also referred to as the packet throughput. As a result, if a network device is transferring packets between two or more nodes that utilize differing data protocols, the network device may not be able to send data packets to one node at the same rate in which they are received from another node, which may result in dropped packets. Additionally, if a network device is operating between several nodes that utilize differing protocols, a bottleneck may result if packets from one node require more processing time than packets from another node.

It is important to note that any reference in this specification to "one embodiment" or "an embodiment" means that a particular feature, structure or characteristic described in connection with the embodiment is included in at least one embodiment of the claimed subject matter. The use of the phrase "one embodiment" in more than one place in the specification does not necessarily refer to the same embodiment.

Referring now to the figures, wherein like parts are designated by like reference numerals through the set of figures, there is illustrated in FIG. 1 a system suitable for practicing one embodiment of the claimed subject matter. FIG. 1 represents one possible embodiment of a computer network 100, which may be used in accordance with the claimed subject matter. Network device 102 is shown coupled to a communications medium 112, which may, for example, be one of the communications media described previously. Network device 102 is coupled through one or more connection points (not shown) to several nodes 104, 106, 108 and 110, by means of a communications medium 112, although this is just one possible embodiment, and the claimed subject matter is not so limited. Typically, each node is coupled to at least one port of the network device, but the claimed subject matter is not limited in this respect. In this context, a connection point may comprise any appropriate connector to allow a physical or logical connection for one or more types of communications media. Additionally, one physical or logical connection on a network device may be capable of connection to more than one port of the network device. For example, one physical connection on a network device may be capable of sending packets to differing ports. The routing of a packet may depend on the type of protocol used by the packet. The physical devices and communication medium may comprise many differing types and categories. Network device 102 may comprise at least one network processor 116. The network processor 116 may include the capability to execute one or more software threads, which serve the primary purpose of utilizing the network processor to process data sent and/or received over an associated port. It is important to note that the claimed subject matter is not limited to network devices that comprise only one processor. For example, a network device that utilizes a main or core processor and one or more lower level processors, also referred to as microengines, may be in accordance with at least one embodiment of the claimed subject matter.

Figure 2:
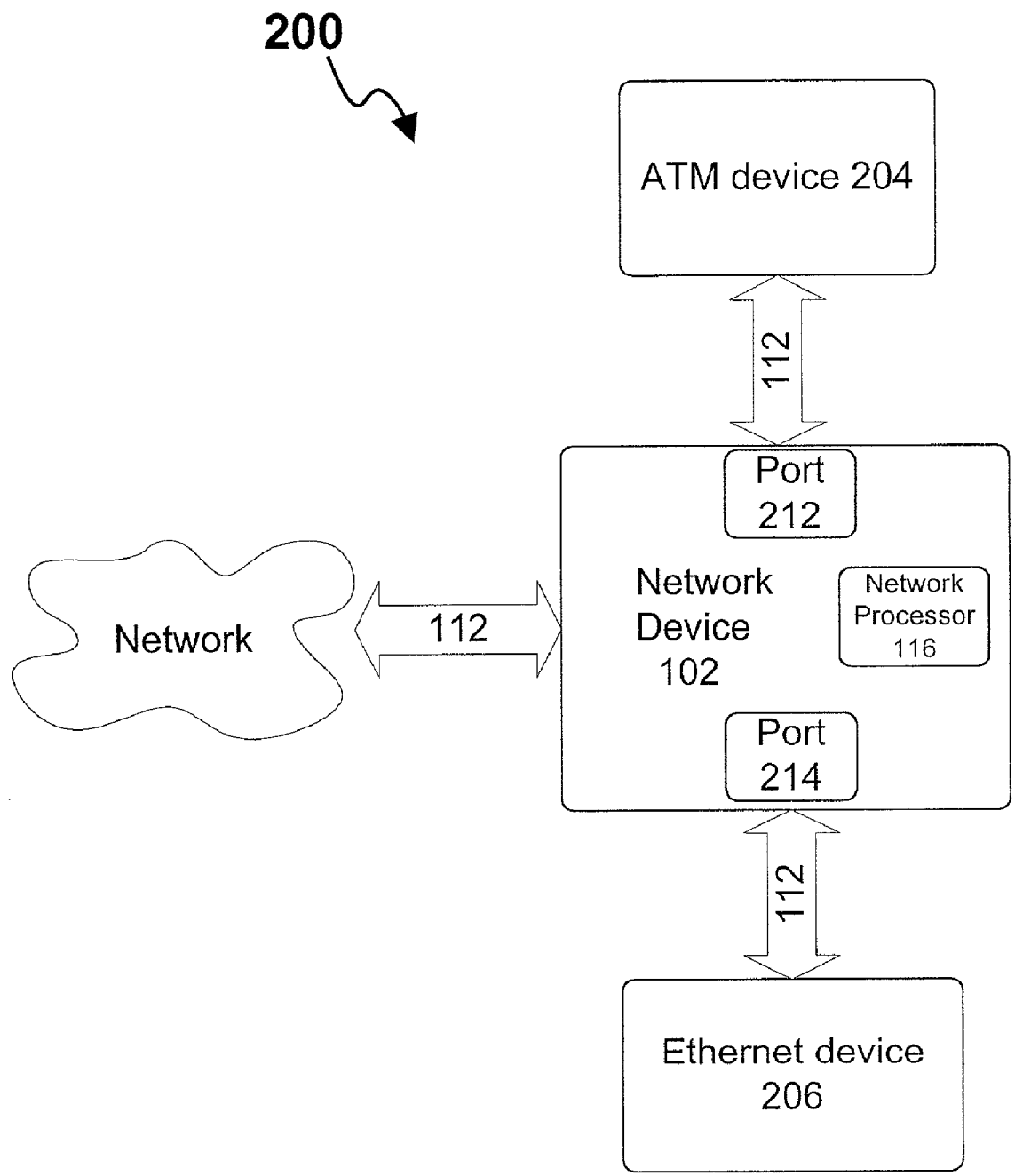
FIG. 2 is a second block diagram of a system suitable for practicing one embodiment of the claimed subject matter.

A desirable property of a network device, such as network device 102 of FIG. 1, may be the ability to operate at a high data processing rate. The data processing rate for a network device may be measured in bits per second. Another desirable property of a network device may be the ability to process packets at a relatively high rate, also referred to as high data packet throughput. The data packet throughput may be affected by differences in the protocols used by nodes, such as nodes 104, 106, 108 and 110, of FIG. 1, for example. Data packet throughput may also be affected by the size of the packets, which may be dependent at least in part on the protocol used by a particular node. Differences in the protocols used by the nodes in network 100 may result in a bottleneck or reduction in speed of the network 100. In accordance with one embodiment of the claimed subject matter, network device 102 may include the capability to manage data and schedule use of the network processor 116 by one or more software threads, in order to efficiently process data for differing devices on a network, as will be explained in more detail in reference to FIG. 2.

As stated previously, one or more nodes may be coupled to communications media, which may be coupled through one or more connection points to a network device. This coupling may result in one or more nodes being coupled to one or more ports, such as TCP ports, for example. Referring now to network segment 200 of FIG. 2, in one embodiment of the claimed subject matter, a network device may have multiple TCP ports, such as ports 212 and 214 of network device 102, which may be configured to transmit and/or receive packets from one or more nodes. Typically, one or more software threads, typically executed by network processor 116, serve the primary purpose of processing data sent and/or received over an associated port, such as ports 212 or 214, for example. However, in alternative embodiments, a single software thread may process data over multiple ports.

These software threads may alternatively be referred to as port threads. In this embodiment, the network segment 200 comprises an Ethernet device 206 coupled to a communications medium 112. Ethernet device 206 is coupled to network device 102 through communications medium 112, and network device 102 is additionally to asynchronous transfer mode (ATM) device 204, through a communications medium 112. Network segment 200 may, in this embodiment, represent a bridge application, with the network device forming a bridge between the ATM device 204 and the Ethernet device 206. Ethernet device 206 and ATM device 204 may use differing protocols, such as, for example, a protocol in compliance with the Ethernet Specification, or AAL (ATM Adaptation Layer) protocol, as defined in ITU-T Standard 1.363, ("AAL Specification"), which may be obtained from http://www.itu.int.

Several differences exist between Ethernet protocol and AAL protocol, and the claimed subject matter is not limited in this context. As a result of these differing protocols, network processor 116 may spend the same or similar processing time on each port thread, resulting in information being processed at the same rate over each port, such as 100 Mb/s over each port. The number of data packets processed over each port, or packet throughput, may be different. In operation, the Ethernet device 206 may have the capability to send and receive packets faster than the ATM device 204. This may occur in part due to the AAL protocol being more computationally complex than the Ethernet protocol, set forth in the Ethernet Specification, and additional data may be required when sending and/or receiving packets. In this embodiment, port 214 of network device 102 may have the capability to receive packets at a relatively high rate, but port 212 of network device 102 may not have the capability to send the packets to the ATM device 204 at the same rate. This may result in a failure to optimize the capabilities of the ATM device 204, for example, and may create a bottleneck in the network. Conversely, the Ethernet device 206 may be sending packets to port 214 at a relatively fast rate, but port 212 may not have the capability to receive packets at the same rate, due at least in part to the requirements of the ATM protocol previously described. This may result in some packets being dropped, or not successfully received by the ATM device 204. In accordance with one embodiment of the claimed subject matter, network device 102 may include the capability to manage data passed between an ATM port and an Ethernet device by managing processing time of network processor 116.

In one embodiment of the claimed subject matter, a method and apparatus for managing network traffic may comprise a network traffic scheduler. In this embodiment, the network traffic scheduler may include the ability to assign or control the processing time spent by the network processor 116 on a software thread executing for a port, such as ports 212 and 214 of FIG. 2, and shift processing from one thread to another, for example. The amount of processing time to spend on a particular port thread may be determined by monitoring the quantity of information transmitted over a first time period over a first port of a network device. This quantity of information may then be compared to another value, which may be a value based, at least in part, on the quantity of information transmitted over that first time period over one or more additional ports of the network device. This assigning or controlling of processor time may result in the quantity of information being transmitted over the first port over subsequent time periods to be modified. It will, however, be understood that the claimed subject matter is not limited to any particular method for determining time. Reference to flowchart 300 will illustrate one possible embodiment of the network traffic scheduler.

Figure 3:
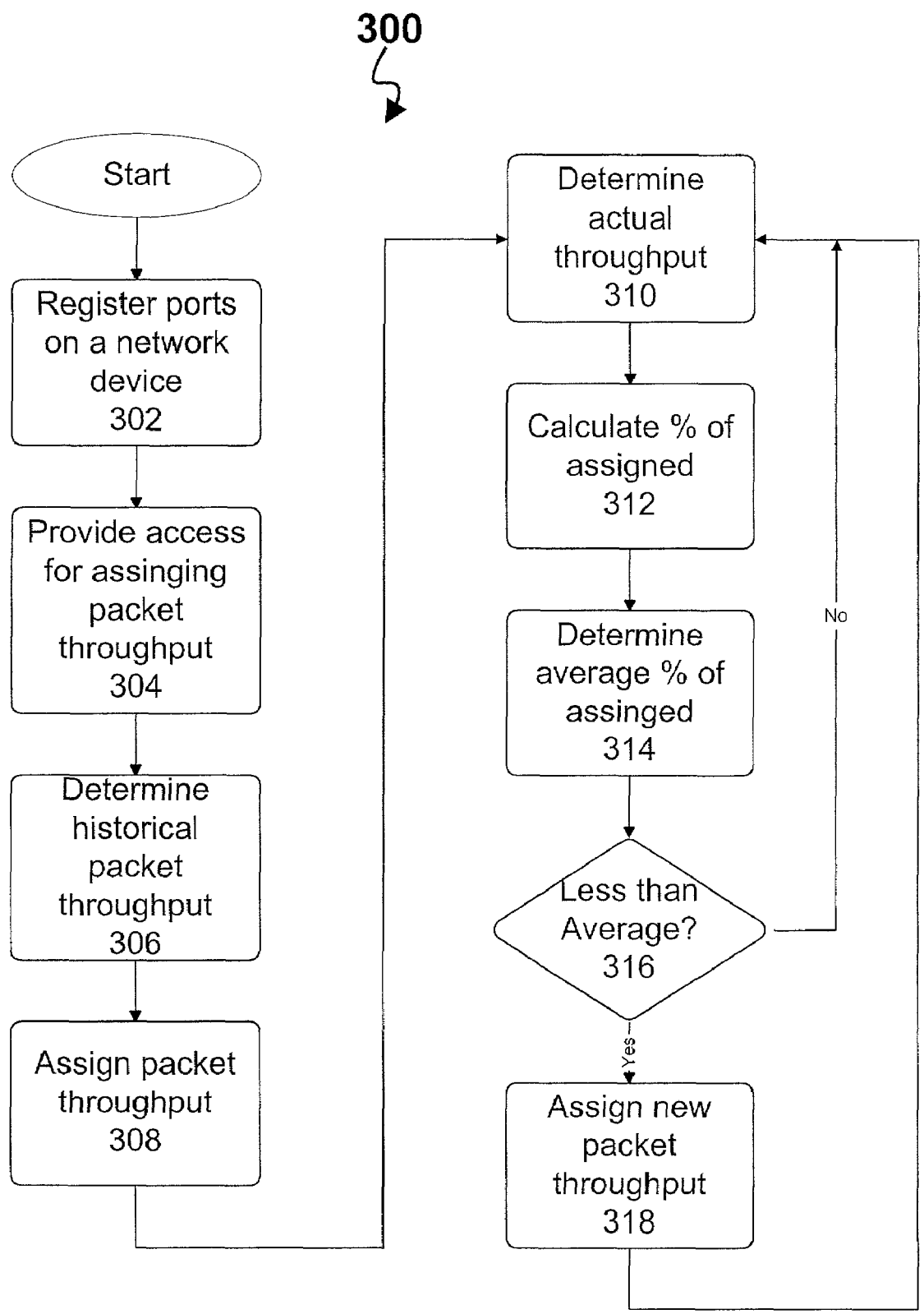
FIG. 3 is a block flow diagram illustrating the logic performed by one embodiment of the claimed subject matter.

Flowchart 300 of FIG. 3 demonstrates a method of managing network traffic in accordance with the claimed subject matter, in the form of a block flow diagram of programming logic. In this embodiment, the network traffic scheduler may be operating as software and executed by one or more of the network processors of a network device, although the claimed subject matter is not so limited. It can be appreciated that the sequence of the logic may be modified and still fall within the scope of the claimed subject matter. An initial step in this method is to register one or more ports residing on a network device. This may comprise an acknowledgement or identification of one or more ports. Once registered, at block 304, access for assigning packet throughput for one or more registered ports is provided by the network device, which may comprise configuration of a software thread for a registered port, for example. At block 306, a historical packet throughput may be determined with respect to one or more of the registered ports, which may comprise a determination of the number of packets sent and/or received over a registered port over a time period, for example. At functional block 308, a desired packet throughput rate may be assigned to one or more of the registered ports, and may comprise modification of one or more software threads, for example. The desired packet throughput rate may be a limit or maximum number of packets that may be processed through a port over a subsequent time period, for example. This value may be based at least in part on the historical rate determined at block 306. Additionally, the desired packet throughput rate may be a value equal to the historical rate for one or more additional ports determined at block 306, or an average thereof, but the claimed subject matter is not limited to any particular criteria for determining desired throughput. The actual packet throughput rate is determined at block 310, and may be a determination of the number of packets processed over a registered port since the assignment at block 308. At block 312, a calculation is made for one or more registered ports of the percentage of assigned packet throughput achieved. At block 314, an average of the percentage of assigned packet throughputs achieved for at least a portion of all registered ports is determined. At block 316, the average value determined at block 314 is compared to the achieved value determined at block 312. In this embodiment, if the achieved percentage of assigned packets processed by or through a registered port is less than the average of the percentages of assigned packets processed by at least a portion of all registered ports, then a new packet throughput is assigned for an associated port at functional block 318. This may, for example, be an incremental increase in the number of packets to be processed, which was assigned at block 308, or may be based on some other value such as the discrepancy between the assigned of block 308 and the actual at block 310 number of packets assigned to be processed over a given port, for example. Alternatively, if the achieved percentage of assigned packets processed over a registered port is greater than or equal to the average of the percentages of assigned packets processed by at least a portion of all registered ports, then, in this embodiment, no modifications are made to the assigned packet throughput, and after more time elapses functional block 310 is returned to and a new determination of actual packet throughput is made at block 310 for an associated port.

In this embodiment, registering one or more ports, as performed at block 302, refers to gathering characteristic information from a port, which may include connection type or communications media utilized, for example. An assignment of packet throughput, as performed at block 308, may be made by modifying the software thread executing on a network processor, the modification comprising assigning a maximum value of packets to be processed over a particular period of time, for example. This modification may result in a network processor altering how much processing time it spends processing one or more software threads. Historical packet throughput rate for the registered ports, as performed at block 306, may be performed by one or more callback functions, and may comprise a count of number of packets processed over a first time period, for example. A callback function, in this context, is a communication mechanism that may be used by one or more components of a computing device, such as a network device. These functions may be used to provide information from one component to another on a particular device. An assignment of packet throughput, as performed at block 308, may be based on a number of criteria or standards, such as a comparison of the packet throughputs of other ports on a network device. A desirable property of the network device may be to have all ports processing the same number of packets over the same period of time. In this case, part of the assigning of block 308 may be a comparison of packet throughputs of other ports on a network device over a time period, and these values or averages of these values may be used to assign the packet throughput of the port currently being monitored. Additionally, the assigning performed at block 318 may entail functions similar to functions performed at block 308, or may be an incremental change in packet throughput assigned, such as an increase of 10% in the packet throughput, for example. It will, of course, be understood that the claimed subject matter is not limited to just these embodiments described, and these are examples of embodiments in accordance with the claimed subject matter.

Another embodiment of the claimed subject matter may be illustrated by way of example. Network device 102 of FIG. 2 may be coupled to Ethernet device 206, by means of communications medium 112. Network device 102 may additionally be coupled to ATM device 204, through a communications medium 112. An initial step in this embodiment is to register ports 212 and 214, which are coupled to ATM device 204 and Ethernet device 206, respectively. Once registered, access for assigning packet throughput for ports 212 and 214 is provided, which may comprise the network device 102 allowing configuration of a software thread associated with port 212 and 214, for example. A historical packet throughput may be determined for port 212 and 214, and may comprise a determination of the number of packets sent and/or received by each port over a time period, for example. A desired packet throughput may be assigned to ports 212 and 214, and assignment may comprise modification of one or more software threads. The desired packet throughput for the ports may be a value in accordance with a comparison of the respective actual throughputs. Alternatively, after throughput rates are assigned to the ports, an actual throughput may be determined for each port. The actual throughput may then be compared to the assigned throughput. This comparison may result in a determination of percentage of throughput achieved. The percentage of throughput achieved for ports 212 and 214 may be compared, and a new packet throughput may be assigned to one or both of the ports in accordance with this comparison.

Embodiments of the claimed subject matter may be implemented in hardware, firmware or software, or any combination thereof. Embodiments of the claimed subject matter may be implemented as a computer program executing on a computing system, comprised of at least one processor, a data storage system, which includes volatile and non-volatile memory and/or storage elements, at least one input device, and at least one output device. The network device 102 of FIG. 2 may be utilized in one embodiment of the claimed subject matter. Device 102 may include one or more network processors, but is shown in this embodiment with a single network processor 116. Network processor 116 processes data signals, and may comprise, for example, a processor from the Intel® IXPL 1200 network processor family, available from Intel® Corporation. The network processor 116 for device 102 may be coupled to a bus (not shown) that transmits data signals between processor 116 and other components in the network device 102. Network device 102 may include random access memory and read only memory (not shown), which may store instructions and/or data represented by data signals that may be executed by the network processor. The instructions and/or data may comprise code for performing any and/or all of the techniques, for example. A cache memory (not shown) may reside within the network processor 116. For purposes of this application, a network processing system embodying components in accordance with the claimed subject matter includes any system capable of performing networking functions such as the functions previously described, and that has a processor, such as, for example, a digital signal processor (DSP), a microcontroller, an application specific integrated circuit (ASIC), or a microprocessor.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. A method for managing network traffic comprising:
monitoring quantity of information transmitted over a first time period over a first port of a network device, said first port using a first type of data protocol;
comparing said quantity to a value, wherein said value is determined based, at least in part, on monitoring the quantity of information transmitted over a second time period over one or more additional ports of said network device, said one or more additional ports using a second type of data protocol;
modifying a processing time assigned to a software thread to cause a change in the quantity of information transmitted by the first port over a subsequent time period in accordance with said comparison; and
transmitting signals from the first port over a communication medium,
wherein said first port using the first type of data protocol comprises the first type of data protocol as transmission control protocol (TCP) and wherein said one or more additional ports using the second type of data protocol comprises the second type of data protocol including at least one of Ethernet and asynchronous transfer mode (ATM).

2. The method of claim 1, wherein said monitoring comprises determining the number of packets transmitted over a particular period of time.

3. The method of claim 1, wherein said monitoring is performed by one or more callback functions.

4. The method of claim 1, wherein said modifying comprises altering the amount of processing time spent on the first port to approximately match the processing time spent on the one or more additional ports.

5. The method of claim 1, wherein said modifying is performed by altering the processing time spent by the network device on processing electronic data of the first port.

6. The method of claim 1, wherein the first period of time and the second period of time are approximately equal.

7. A computer-readable medium, having stored thereon instructions, that when executed by a computing system cause the computing system to:
monitor quantity of electronic data transmitted over a first time period over a first port of a network device, said first port using a first type of data protocol;
compare said quantity to a value, wherein said value is determined based, at least in part, on monitoring the quantity of electronic data transmitted over a second time period over one or more additional ports of said network device, said one or more additional ports using a second type of data protocol;

modify a processing time assigned to a software thread to cause a change in the quantity of electronic data transmitted by the first port over a subsequent time period based, at least in part, on said comparison; and transmit signals from the first port over a communication medium, wherein said first port using the first type of data protocol comprises the first type of data protocol as transmission control protocol (TCP) and wherein said one or more additional ports using the second type of data protocol comprises the second type of data protocol including at least one of Ethernet and asynchronous transfer mode (ATM).

8. The computer-readable medium of claim 7, wherein said monitoring comprises determining the number of packets transmitted over a particular period of time.

9. The computer-readable medium of claim 7, wherein said monitoring is performed by one or more callback functions.

10. The computer-readable medium of claim 7, wherein said modifying comprises altering the amount of processing time spent on the first port to approximately match the processing time spent on the one or more additional ports.

11. The computer-readable medium of claim 7, wherein said modifying is performed by altering the processing time spent by the network device on processing electronic data of the first port.

12. The computer-readable medium of claim 7, wherein the first period of time and the second period of time are approximately equal.

13. A network device comprising:
at least one network processor and two or more ports, said network device having the capability to, in operation, perform the following:
monitor quantity of information transmitted over a first port of said two or more ports over a first time period, said first port to use a given type of data protocol
monitor quantity of information transmitted over one or more additional ports of said two or more ports, said one or more additional ports to use another given type of data protocol:
compare said quantities of information monitored for said first port and one or more additional ports; and
modify a processing time assigned to a software thread executing on the network processor to cause a change in the quantity of information transmitted by at least one of said first port and one or more additional ports over a subsequent time period in accordance with said comparison,
wherein said first port using the given type of data protocol comprises the given type of data protocol as transmission control protocol (TCP) and wherein said one or more additional ports using the other given type of data protocol comprises the other given type of data protocol including at least one of Ethernet and asynchronous transfer mode (ATM).

14. The apparatus of claim 13, wherein said two or more ports comprise at least one physical connection to said network device.

15. The apparatus of claim 13, wherein said network device comprises an Ethernet device.

16. The apparatus of claim 13, wherein said network device comprises a router.

17. The apparatus of claim 13, wherein said network device has the capability to, in operation, have monitoring comprise determining the number of packets transmitted over a particular period of time.

18. The apparatus of claim 13, wherein said network device has the capability to, in operation, have monitoring performed by one or more callback functions.

19. The apparatus of claim 13, wherein said network device has the capability to, in operation, have modifying comprise altering the amount of processing time spent on said first port to approximately match the processing time spent on said one or more additional ports.

20. The apparatus of claim 13, wherein said network device has the capability to, in operation, have modifying performed by altering the processing time spent by the network device on processing electronic data of one of the two or more ports.

21. A system comprising:
a network device, comprising at least one network processor and two or more ports;
at least one transmitting asynchronous transfer mode (ATM) device coupled to at least one of the two or more ports of the network device; and
at least one receiving Ethernet device coupled to at least one of the two or more ports of the network device, wherein said network device has the capability to, in operation, perform the following:
receive information from the at least one transmitting ATM device;
transmit at least a portion of said information to said at least one receiving Ethernet device;
monitor at least a portion of the quantity of information transmitted and quantity of information received;
compare said quantities of information monitored; and
modify a processing time assigned to a software thread executing on the network processor to cause a change in the quantity of information transmitted to said receiving Ethernet device in accordance with said comparison.

22. The system of claim 21, wherein said two or more ports comprise at least one physical connection to said network device.

23. The system of claim 21, wherein said network device comprises an Ethernet device.

24. The system of claim 21, wherein said network device has the capability to, in operation, have monitoring comprise determining the number of packets transmitted over a particular period of time.

25. The system of claim 21, wherein said network device has the capability to, in operation, have monitoring performed by one or more callback functions.

26. The system of claim 21, wherein said network device has the capability to, in operation, have modifying comprise altering the amount of processing time spent on a first port of said two or more ports to approximately match the processing time spent on one or more additional of said two or more ports.

27. The system of claim 21, wherein said network device has the capability to, in operation, have modifying performed by altering the processing time spent by the network device on processing electronic data of one of the two or more ports.

* * * * *